US008464175B2

(12) United States Patent
Turcan et al.

(10) Patent No.: US 8,464,175 B2
(45) Date of Patent: Jun. 11, 2013

(54) JOURNAL DISPLAY HAVING THREE DIMENSIONAL APPEARANCE

(75) Inventors: Peter J. Turcan, Seattle, WA (US); Wyatt D. Jackson, Sammamish, WA (US); Michael T. Wasson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2032 days.

(21) Appl. No.: 11/008,057

(22) Filed: Dec. 9, 2004

(65) Prior Publication Data

US 2006/0236260 A1 Oct. 19, 2006

(51) Int. Cl.
*G06F 3/048* (2006.01)

(52) U.S. Cl.
USPC ............................................ 715/776; 715/839

(58) Field of Classification Search
CPC .................................... G06F 3/00; G06F 3/048
USPC .......................................... 715/776, 749, 839
See application file for complete search history.

(56) References Cited

U.S. PATENT DOCUMENTS

| | | | | |
|---|---|---|---|---|
| 5,255,352 A * | 10/1993 | Falk | ............................... | 345/582 |
| 5,417,575 A | 5/1995 | McTaggart | | |
| 5,463,725 A * | 10/1995 | Henckel et al. | ............... | 715/776 |
| 5,632,022 A * | 5/1997 | Warren et al. | .................. | 715/776 |
| 5,748,931 A * | 5/1998 | Jones et al. | .................... | 715/853 |
| 5,778,381 A * | 7/1998 | Sandifer | ............................... | 1/1 |
| 5,808,614 A * | 9/1998 | Nagahara et al. | ............. | 715/848 |
| 5,812,134 A * | 9/1998 | Pooser et al. | .................. | 715/848 |
| 5,820,379 A * | 10/1998 | Hall et al. | ...................... | 434/178 |
| 5,847,709 A | 12/1998 | Card et al. | | |
| 5,957,697 A * | 9/1999 | Iggulden et al. | ............... | 434/317 |
| 6,028,603 A * | 2/2000 | Wang et al. | ..................... | 715/776 |
| 6,075,540 A * | 6/2000 | Hoppe | .......................... | 345/419 |
| 6,091,930 A * | 7/2000 | Mortimer et al. | ............. | 434/362 |
| 6,195,497 B1 * | 2/2001 | Nagasaka et al. | ............... | 386/46 |
| 6,240,410 B1 * | 5/2001 | Wical | ..................................... | 1/1 |
| 6,289,363 B1 | 9/2001 | Consolatti et al. | | |
| 6,389,541 B1 * | 5/2002 | Patterson | .......................... | 726/9 |
| 6,486,895 B1 * | 11/2002 | Robertson et al. | ............ | 715/776 |
| 6,701,301 B2 * | 3/2004 | Seet et al. | ......................... | 705/14 |
| 6,741,268 B1 * | 5/2004 | Hayakawa | ...................... | 715/777 |
| 6,820,111 B1 * | 11/2004 | Rubin et al. | ................... | 709/203 |
| 6,952,806 B1 * | 10/2005 | Card et al. | ..................... | 715/802 |
| 7,020,663 B2 * | 3/2006 | Hay et al. | ................... | 707/104.1 |
| 7,047,490 B1 * | 5/2006 | Markovic et al. | ............. | 715/234 |
| 7,071,915 B2 * | 7/2006 | Liang et al. | ................... | 345/156 |
| 7,281,229 B1 * | 10/2007 | Jayapalan | ........................ | 716/11 |

(Continued)

OTHER PUBLICATIONS

David Hellsing, "No More CSS Hacks", http://www.stylegala.com/articles/no_more css hacks.htm (2004, pp. 1-24).*

*Primary Examiner* — Doon Chow
*Assistant Examiner* — Le Nguyen
(74) *Attorney, Agent, or Firm* — Senniger Powers LLP (57) ABSTRACT

A graphical user interface for use with a computer system including a display and a user selection device for selecting audio files, video files, and image files. A layout engine responds to a format file referenced to the selected audio files, the selected video files and the selected image files. A rendering engine generates journal display data defining a 3D journal image in accordance with the format file, the journal display data being provided to the display and corresponding to a 3D model. A bookshelf engine manages multiple 3D journal images.

21 Claims, 3 Drawing Sheets

U.S. PATENT DOCUMENTS

| | | | |
|---|---|---|---|
| 7,424,129 B2 * | 9/2008 | Hull et al. | 382/100 |
| 7,432,940 B2 * | 10/2008 | Brook et al. | 345/629 |
| 7,447,771 B1 * | 11/2008 | Taylor | 709/225 |
| 2001/0007980 A1 * | 7/2001 | Ishibashi et al. | 705/26 |
| 2002/0049787 A1 * | 4/2002 | Keely et al. | 707/512 |
| 2002/0059342 A1 | 5/2002 | Gupta et al. | |
| 2002/0118230 A1 * | 8/2002 | Card et al. | 345/776 |
| 2002/0133464 A1 * | 9/2002 | Ress et al. | 705/51 |
| 2002/0188635 A1 * | 12/2002 | Larson | 707/515 |
| 2003/0005302 A1 * | 1/2003 | Searle | 713/176 |
| 2003/0020761 A1 * | 1/2003 | Yanatsubo | 345/833 |
| 2003/0108251 A1 * | 6/2003 | Kim et al. | 382/285 |
| 2003/0163784 A1 * | 8/2003 | Daniel et al. | 715/514 |
| 2003/0237043 A1 * | 12/2003 | Novak et al. | 715/500.1 |
| 2004/0145603 A1 | 7/2004 | Soares | |
| 2005/0102610 A1 | 5/2005 | Jie | |

* cited by examiner

JOURNAL DISPLAY HAVING THREE DIMENSIONAL APPEARANCE

TECHNICAL FIELD

Embodiments of the present invention relate to the field of graphical displays of journals. In particular, embodiments of this invention relate to presentation of journals having a three dimensional (3D) appearance when displayed by a monitor.

BACKGROUND OF THE INVENTION

One of the problems with current computer journals and other documentation, especially but not uniquely documentation for games, is that customers do not read it. One reason for this is our traditional means of rendering the information on a monitor is boring and breaks the "immersion" of the player in their game. In this context, there is a need to greatly increase the emotional involvement of a reader or writer of a document. For example, involving a reader in a travel or sports journal could increase the reader's comprehension and interest in the subject of the journal.

Accordingly, a system for dynamically presenting journals is desired to address one or more of these and other disadvantages.

SUMMARY OF THE INVENTION

The invention increases the emotional involvement of a reader or writer of a journal (such as a travel or sports journal) by providing a journal in 3D electronic form, and by modeling the behavior of a journal, including turning pages, fast browsing through pages, writing and editing directly to a page, and in particular rendering pages, including all pictures and movies, onto the curved surfaces of a page. The invention also may be used to present documentation with an application such as a game in the form of a fully animated journal, so that there is little if any break from the feel of the application. Indeed, an animated journal tends to add to the real feel rather than detract from it.

In one form, the invention comprises a graphical user interface for use with a computer system including a display and a user selection device for selecting audio files, video files, and image files. An engine responsive to a format file referenced to the selected audio files, the selected video files and the selected image files defines a content and a format of a 3D journal. The engine generates journal display data defining a 3D journal image in accordance with the defined content and the defined format, the journal display data being provided to the display and corresponding to a 3D model.

In another form, the invention comprises a computer readable medium having stored thereon a data structure of a journal. The data structure provides a display to create a 3D image of the journal. The data structure comprises a 3D model and a format file referenced to selected audio files, selected video files and selected image files. The 3D model and the format file are configured to define journal display data representing a 3D journal image in accordance with the format file, the journal display data being provided to the display and corresponding to the 3D model.

In another form, the invention comprises a computer readable storage medium that stores a software program comprising an application component, a documentation component related to the application component and a graphical user interface component for displaying the documentation as a 3D image.

In another form, the invention comprises a method. Audio files, video files and image files are selected. A 3D journal image according to a format file referenced to the selected audio files, the selected video files and the selected image files is provided as a layout. The 3D journal image is displayed in accordance with the format file and corresponding to a 3D model.

In another form, the invention comprises a computer readable medium comprising instructions for selecting audio files, video files and image files; laying out in a 3D journal image according to a format file referenced to the selected audio files, the selected video files and the selected image files; and displaying the 3D journal image in accordance with the format file and corresponding to a 3D model.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
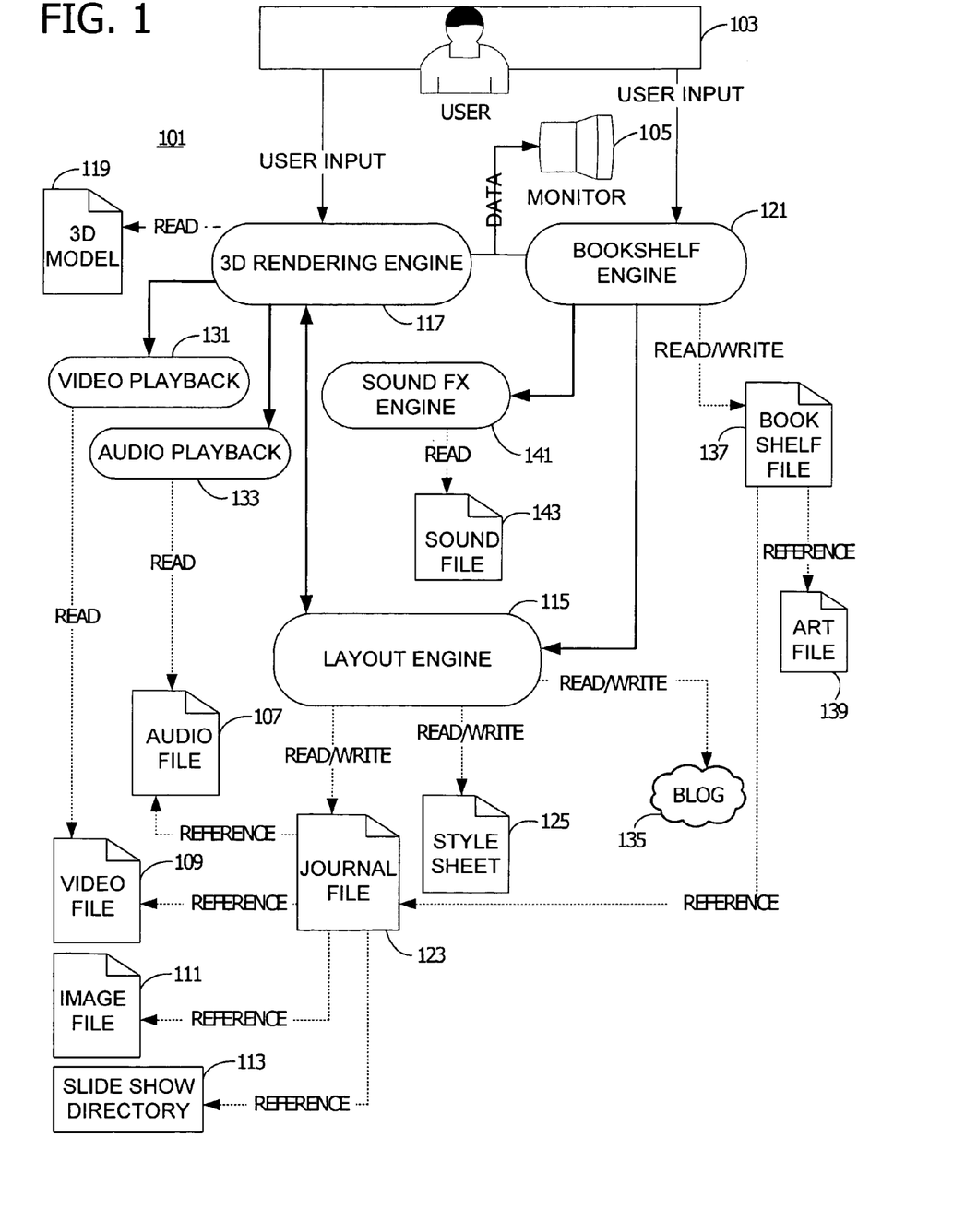
FIG. 1 is an exemplary block diagram illustrating the various components of one embodiment of a system for providing a journal display having a 3D appearance according to the invention.

Referring first to FIG. 1, an exemplary block diagram illustrates the various components of one embodiment of a 3D (three dimensional) journal system 101 for providing a 3D digital journal display (i.e., a journal image) having a 3D appearance according to the invention. As used herein, journal includes at least the following: book, volume, tome, manuscript, paperback, hardback, periodical, magazine, paper, academic journal, weekly, monthly, quarterly, diary, bulletin, review, publication, document, text file, or any other documentation. For example, the 3D journal image may be an on-line magazine, an interactive children's book, a scrapbook, a photo album, a personal journal, a diary, a newsletter, a catalog and a log book. As a further example, the journal may be an on-line magazine, both as a facsimile of a published magazine—giving exact copies of the printed page, or with added features such as audio, movies and animations, both for the editorial content and the advertising. Another implementation may be an on-line company newsletter. Another example is a highly animated children's book—with animations including for example talking figures, or 3D models of aircraft, planets, or other educational subjects. Another example is an on-line catalog, such as a mail-order catalog distributed on-line, where the buyer can browse the catalog, and select any item (perhaps by clicking on it). Selecting an item will take the user to the on-line store to order the item. Those skilled in the art will recognize other forms for the journal.

Figure 3:
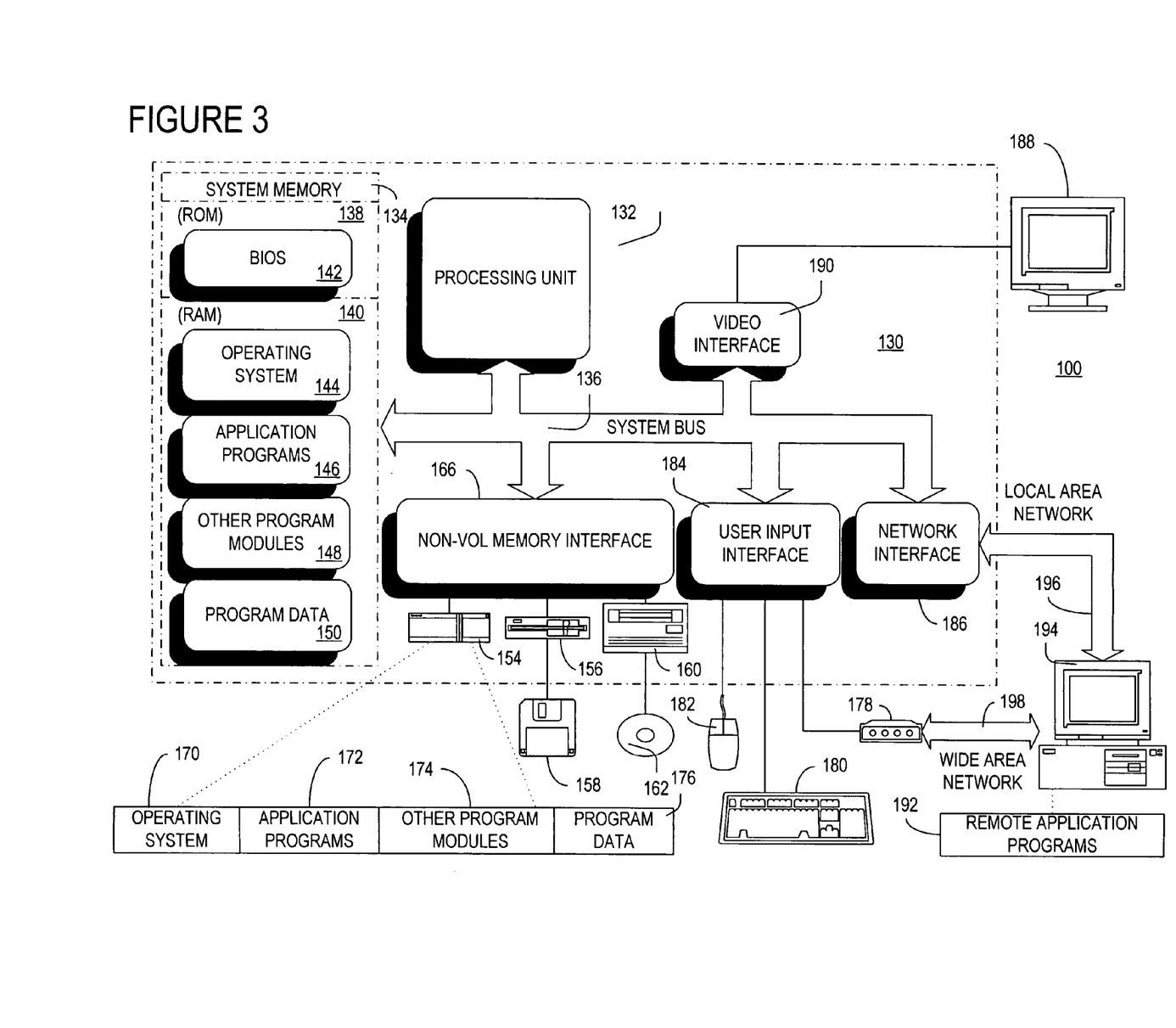
FIG. 3 is a block diagram illustrating one example of a suitable computing system environment in which the invention may be implemented.

In one form, the system 100 is a graphical user interface 103 for use with a computer system (such as illustrated in FIG. 3) including a monitor 105 or other display and a user selection device such as a mouse (see reference character 182 in FIG. 3). The system 101 includes or has access to audio files 107, video files 109, and image files 111. The user uses the selection device to select files which define the content and/or format of the journal. The selected files are referenced to the format file. A slide show directory 113 including such files separately or in combination may also be included.

The system 101 includes a layout engine 115 and a 3D rendering engine 117 which work together to present journal display data to the monitor 105 resulting in the monitor displaying a working 3D model of a journal in which each page, including the covers, are modeled in 3D, and are rendered in 3D. One underlying paradigm of the invention is a hardcover book which, because of the digital media element, becomes a "magic" book, with videos and audio tracks playing, and slide shows being stepped through. Optionally, the system 101 may include a bookshelf engine 121 by which a plurality of journals reside on bookshelves, which are animated versions of a real bookshelves, allowing a user to sort their books according to date or author or other criteria. It also enables applications to add their own journal to the bookshelf.

Layout Engine 117

Among other things, the layout engine 117 controls the list of journal entries including various entry types in an entry list, handles saving and loading, reading and writing to a blog, as well as 2D rendering capabilities, repagination, printing, transferability (pack & go), style sheets and settings, and more.

The layout engine 115 is responsive to a format file which defines the format of the 3D digital journal to be imaged. For example, the format file may include a journal file 123 which may be part of the layout engine 115. In one form, the journal file is in XML format containing all the journal settings and the entries in the journal. The journal file is referenced to selected audio files 107, selected video files 109 and selected image files 11 which define the content of the 3D journal. The format file may also include a style sheet file 125 which may be in any format (e.g., XML format) and is a collection of settings that can be applied to the 3D digital journal.

Rendering Engine 117

The 3D rendering engine 117 generates the journal display data provided to the monitor 105 for defining a 3D journal image according to the format and content defined by the layout engine. This image corresponds to a 3D model 119.

The 3D rendering engine provides the 3D drawing functions for the 3D journal system 101. It also provides user interaction with the 3D journal system 101, such as turning pages, selecting entries, and playing media files. The 3D rendering engine 117 provides at least one of the following functions: browsing pages, curved video, writing, editing on a 3D surface, and user inputs. Further, the functions of the 3D rendering engine 117 may include one or more of the following areas: animation and navigation, displaying journal entries, and editing.

As noted above, as part of the construction of each journal file 123, the user references or links to selected audio files 107, selected video files 109, selected image files 11 and selected slide shows 113. The system 101 includes a video playback component 131 responsive to the rendering engine 117 for rendering the selected video files 109 as part of the 3D journal display. The system 101 also includes an audio playback component 133 responsive to the rendering engine 117 for rendering the selected audio files 107 as part of the 3D journal display. Selected image files 111 and selected slide shows 113 are also linked to the layout engine 115 for conversion into the page layouts that are rendered as part of the 3D journal display for rendering as part of the 3D journal display.

The rendering engine 117 communicates with the layout engine 115 at startup, when pages are rendered, when the user makes a selection from the journal (hit detection), to playback media and to update pages.

It is contemplated that the layout engine and the rendering engine may be integrated into a single component, that part of the function of the layout engine may be accomplished by the rendering engine and visa versa, that part of the rendering engine may be embodied in the rendering engine and visa versa, and that either the layout engine or the rendering engine can be several components. For example, the layout engine may create a journal.

Blog 137

Another optional feature of the layout engine 115 is reading and/or writing to a blog 137. A blog (short for weblog) is often a mixture of what is happening in a person's life and what is happening on the Web, a kind of hybrid diary/guide site, although there are as many unique types of blogs as there are people. On the Internet, a blog is a personal journal that is frequently updated and intended for general public consumption. Blogs generally represent the personality of the author or reflect the purpose of the Web site that hosts the blog. Topics sometimes include brief philosophical musings, commentary on Internet and other social issues, and links to other sites the author favors. The frequent characteristics of the blog are its journal form, typically a new entry each day, and its informal style. The author of a blog is often referred to as a blogger.

Bookshelf Engine 121

It is also contemplated that a user may have a plurality of journals so that there is a need for managing the journals. In order to provide such management, the bookshelf engine 121 may be a part of system 101 for generating bookshelf display data defining a 3D bookshelf image of the plurality of 3D journal images of the plurality of journals. The bookshelf display data is provided to the monitor 105 and corresponds to a bookshelf file 137. The bookshelf file may reference an art file 139 which defines the graphical look of the bookshelf. The art files 139 contain the graphics for the book ends. For example, the bookshelf engine may comprise one or more of the following features which may be implemented in various ways (e.g., included as menu items, operations and/or actions, included as a user interface, and/or included as buttons, etc.): new journal, add to bookshelf, remove from bookshelf, show shelf, new shelf, rename shelf, fixed shelf width, flexible shelf width, append content, move to shelf, pack a copy, permanently delete, rename/restyle, sort on, add book ends, remove book ends, select book ends, select background, find, copy.

According to one embodiment of the bookshelf engine 121 for managing a plurality of journals in the form of books, the books reside on bookshelves, which are animated versions of real bookshelves, allowing a user to sort their books according to such aspects as title, date and/or author. The bookshelf engine 121 also enables other software applications to add their own journal to the bookshelf. It is possible the bookshelf could exist as a tile ("tile" means an application that runs permanently and is accessible through a small user interface that runs on the task bar; also referred to as a "persistent application"), and so have all the users books available to them all of the time. In one form there are two bookshelves created on installation, a "System" bookshelf containing help documentation journals, and a "Display" bookshelf containing sample journals for the new user to examine. A user is free to add as many new bookshelves, identified by a unique name, as they like.

An optional component that interfaces with the bookshelf engine 121 is a sound effect engine 141 and sound file 143. The sound effect engine 141 provides sounds in response to user action or input relating to the bookshelf or otherwise involving the bookshelf engine 121. There may be sound effects associated with most of the operations, such as opening and closing a book, adding a piece of text or media, removing a piece of text or media, page turning, moving a chunk of pages in one go.

The bookshelf engine 121 communicates with the 3D rendering engine 117 when journals are opened and closed. The bookshelf engine 121 communicates with the layout engine 115 when a new journal is created, when appending a file to an existing journal, when restyling an existing journal or when packing a journal.

In one form, the software aspects of system 101 may be a computer readable medium having stored thereon a data structure of a journal. The data structure provides data to a display to create a 3D image of the journal and comprises the 3D model 119 and the format file (e.g., journal file 123 and/or style sheet 125) referenced to the selected audio files 107, the selected video files 109 and the selected image files 11. The journal display data defines a 3D journal image in accordance with the format file. The journal display data is provided to the monitor 105 and corresponds to the 3D model 119.

In yet another form, the graphical user interface of the invention may be used in combination with an application program. In particular, the invention would comprise a computer readable medium software program including an application component, a documentation component related to the application component, and the graphical user interface component for displaying the documentation as a 3D image. The application component and the related documentation component may be at least one of the following: a game and instructions for game, a flight simulator game and a flight manual for the flight simulator game, an adventure game and a map for the adventure game, a media application and a manual of the media application, an interactive resource and a tutorial for the resource, a movie and editorial content related to the movie, an animated movie and editorial content related to the animated movie, a video clip and advertising attached to the video clip, an audio clip and advertising attached to the audio clip.

For example, 3D documentation for games according to the invention would provide help in the form of a journal would not break the user out of the "immersion" in the game, such as a flight manual in a flight simulator game, a magic book in an adventure game, or as part of the adventure game for example in the form of a book of maps. Software (or other instructional) tutorials, where the pages turn automatically as the videos are played and possibly the text read out loud would also encourage the user to take advantage of the tutorials. The user could interrupt the auto playing at any time, for any reason, and restart it again from any page.

In another form, the invention includes a method wherein the user selects audio, video and image files and lays out in a 3D journal image according to a format file referenced to the selected files, so that the 3D journal image in accordance with the format file and corresponding to a 3D model is displayed.

Figure 2:
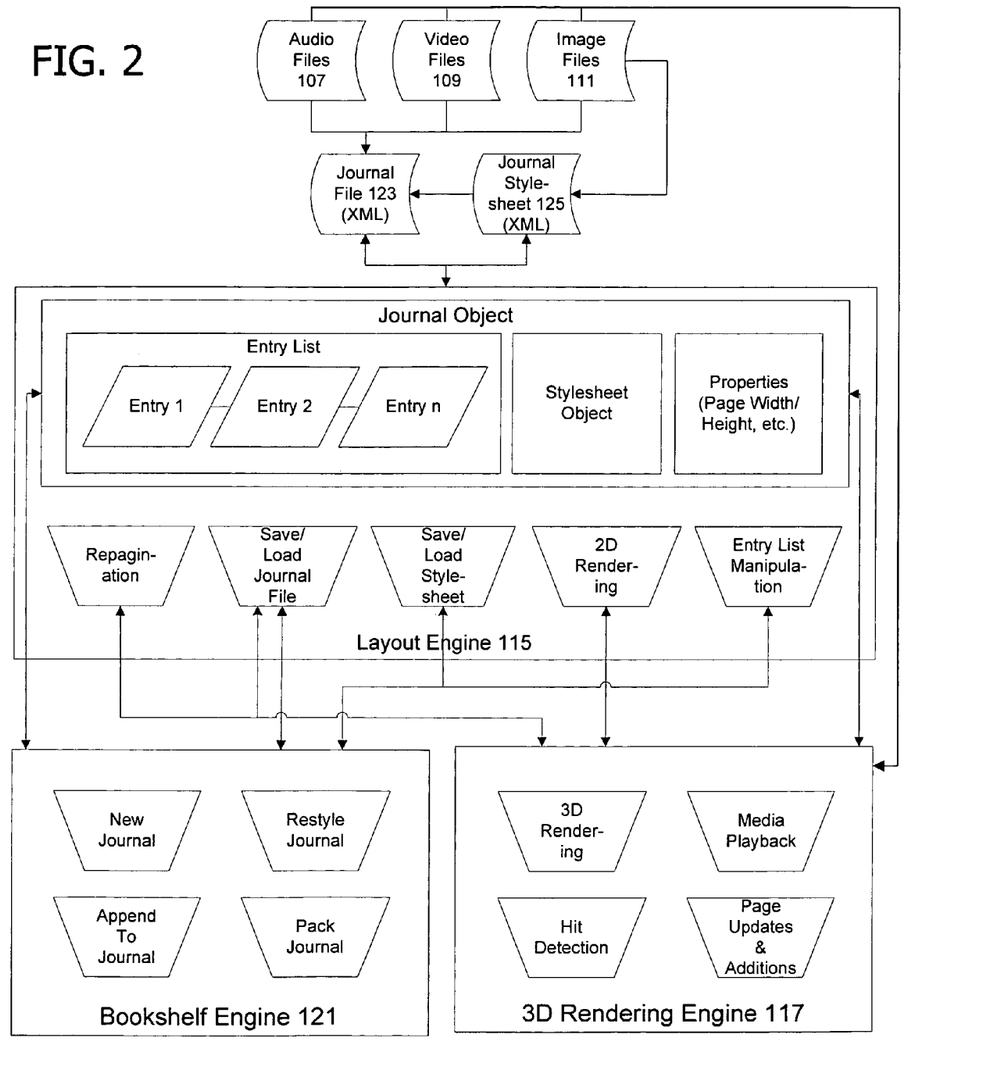
FIG. 2 is an exemplary flow chart illustrating operation of the system of FIG. 1 and the interaction between various components.

Referring next to FIG. 2, an exemplary flow chart illustrating operation of the system of FIG. 1 and the interaction between various components is shown. Selected audio files 107, selected video files 109 and selected image files 111 are referenced to the journal file 123 which is controlled by the style sheet 125. This referenced journal file 123 and style sheet file 125 are used by the layout engine 115 to create a journal object including entries, a style sheet object and properties, all of which are embodied in data supplied to the monitor 105. The layout engine 115 also responds to user actions as indicated by blocks labeled repagination, save/load journal file, save/load style sheet, 2D rendering and entry list manipulation. The bookshelf engine 121 includes user actions such as new journal, restyle journal, append to journal and pack journal which interact with the journal object and with save/load journal file, save/load style sheet and entry list manipulation of the layout engine 115. The 3D rendering engine 117 includes actions such as 3D rendering, media playback, hit detection and page updates & additions which interact with the journal object and with repagination, save/load journal file and 2D rendering.

FIG. 3 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, data structures, program modules and other data for the computer 130. In FIG. 3, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 2 to provide a 3D journal display on monitor 188.

The following examples further illustrate the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A graphical user interface on an electronic device with a display, a memory, and one or more processors to execute one or more programs stored in the memory, the graphical user interface, the graphical user interface for use with a computer system including a display and a user selection device for selecting and modifying video files and image files, said interface comprising:

a format file corresponding to a 3D journal model, said format file comprising a style sheet defining a format of the 3D journal model, said format file further comprising a journal file referenced to the selected video files and referenced to the selected image files, said journal file defining a content of the 3D journal model, said format file corresponding to a 2D image rendered by a layout engine;

a layout engine responsive to the format file, said layout engine rendering 2D journal display data defining a 2D journal image having a 2-dimensional appearance, said 2D journal display data corresponding to the format file;

a rendering engine communicating with the layout engine and adapting the 2D journal display data rendered by the layout engine, said rendering engine generating 3D journal display data defining a 3D journal image corresponding to the 2D journal display data, the defined content and the defined format, wherein the rendering engine comprises the following features: animation, navigation, rendering journal entries and editing;

a plurality of different format files and a plurality of corresponding 3D journal images;

a bookshelf engine generating bookshelf display data defining a 3D bookshelf image of the plurality of 3D journal images, the bookshelf display data being provided to the display and correspondent to a bookshelf file, wherein said bookshelf engine comprises the following features: new journal, add to bookshelf, remove from bookshelf, show shelf, new shelf, rename shelf, fixed shelf width, flexible shelf width, append content, move to shelf, pack a copy, permanently delete, rename/restyle, sort on, add book ends, remove book ends, select book ends, select background, find, and copy, wherein the rendering engine renders the 3D bookshelf image, and wherein the bookshelf engine accesses and manipulates the plurality of different format files via the layout engine, wherein the rendering engine modifies the 2D journal display data to generate the 3D journal display data, wherein said 3D journal image has a 3-dimensional appearance different than the 2-dimensional appearance of the 2D journal image, wherein the rendering engine provides the 3D journal display data to the display, wherein the rendering engine receives user interactions with the 3D journal image and in response to the received user interactions modifies the 3D journal display data and the 2D journal display data defining the 3D journal image to define modified 3D journal display data and modified 2D journal display data in response to the user interactions with the 3D journal image to render a modified 3D journal image corresponding to the modified 3D journal display data which reflects the user interactions with the 3D image, and wherein the rendering engine provides the modified 3D journal display data to the display to present a modified display corresponding to the received user interactions.

2. The interface of claim 1 further comprising a video playback component responsive to the rendering engine for providing to the display the selected files to which the format file is referenced.

3. The interface of claim 1 wherein the layout engine comprises at least one of the following features: creating a journal, handling entry types in an entry list, reading and writing to a blog, 2D rendering, repaginating, printing, transferring, saving, loading and style settings.

4. The interface of claim 1 wherein the rendering engine provides at least one of the following: curved video and editing on a surface having a 3D appearance.

5. The interface of claim 1 further comprising a sound effects engine for generating sounds in response to user action.

6. The interface of claim 1 wherein the 3D journal image comprises at least one of the following: an on-line magazine, an interactive children's book, a scrapbook, a photo album, a personal journal, a diary, a newsletter a catalog and a log book.

7. A computer readable storage medium having stored thereon a data structure of a journal, said data structure comprising:
   a 3D journal model having the following features: animation, navigation, rendering journal entries and editing;
   a format file corresponding to the 3D journal model, said format file comprising a style sheet defining the format of the 3D journal model, said format file further comprising a journal file referenced to the selected video files and referenced to the selected image files, said journal file defining the content of the 3D journal model, said format file corresponding to a 2D image rendered by a layout engine;
   a journal display data corresponding to the format file defining a 3D journal image in accordance with the 2D image of the defined content and the defined format wherein the 3D journal image comprises a 3D rendering of the 2D image, the journal display data being provided to a display and corresponding to the selected video files and the selected image files displayed in a form corresponding to the 3D journal model, wherein a rendering engine renders the 3D journal image on the display, said rendering engine responsive to user interactions with the 3D journal image; and
   a plurality of different format files, a plurality of corresponding 3D journal images and a bookshelf file wherein the bookshelf file is configured to generate bookshelf display data defining a 3D bookshelf image of the plurality of 3D journal images, the bookshelf display data being provided to the display and corresponding to the bookshelf file, wherein the rendering engine renders the 3D bookshelf image, wherein the bookshelf engine accesses and manipulates the plurality of different format files via the layout engine, wherein the bookshelf file comprises the following features: new journal, add to bookshelf, remove from bookshelf, show shelf, new shelf, rename shelf, fixed shelf width, flexible shelf width, append content, move to shelf, pack a copy, permanently delete, rename/restyle, sort on, add book ends, remove book ends, select book ends, select background, find, and copy,
   wherein the rendering engine communicates with the layout engine to modify the journal display data defining the 3D journal image and to modify the format file corresponding to the 2D image to render a modified 2D image in response to user interactions with the 3D journal image and to further render a modified 3D image of the modified 2D image wherein the modified 3D image and the modified 2D image reflect the user interactions with the 3D journal image.

8. The structure of claim 7 further comprising at least one of the following relating to the format file: handling entry types in an entry list, saving, loading, reading and writing to a blog, 2D rendering, repaginating, printing, transferring, and style settings.

9. The structure of claim 7 further comprising at least one of the following features related to the 3D model: curved video and editing on a surface having a 3D appearance.

10. The structure of claim 7 further comprising a sound effects file for use in generating sounds in response to user action.

11. The structure of claim 7 wherein the 3D journal image comprises at least one of the following: an on-line magazine, an interactive children's book, a scrapbook, a photo album, a personal journal, a diary, a newsletter a catalog and a log book.

12. A method comprising:
   selecting video files and image files;
   responsive to a format file referenced to the selected video files and referenced to the selected image files, said format file comprising a style sheet defining the format of the 3D journal model, said format file further comprising a journal file referenced to the selected video files and referenced to the selected image files, said format file defining a 2D image having a 3D appearance corresponding to the 3D journal model, said 2D image being rendered by a layout engine, said 3D journal model having the following features: animation, navigation, rendering journal entries and editing;
   adapting the 2D image obtained via the layout engine and generating journal display data defining a 3D journal image in accordance with the 2D image of the defined content and the defined format wherein the 3D journal image comprises a 3D rendering of the 2D image, the journal display data being provided to a display and corresponding the selected video files and the selected image files displayed in a form corresponding to the 3D journal model, wherein a rendering engine renders the 3D journal image on a display, said rendering engine being responsive to user interactions with the 3D image, wherein the rendering engine communicates with the layout engine to modify the journal display data defining the 3D journal image and to modify the format file defining the 2D journal image to render a modified 2D image in response to user interactions with the 3D journal image and to further render a modified 3D image wherein the modified 3D image and the modified 2D image reflect the user interactions with the 3D image; and
   generating bookshelf display data defining a 3D bookshelf image of the 3D journal image, the bookshelf display data being provided to the display and corresponding to a bookshelf file, wherein the rendering engine renders the 3D bookshelf image, and wherein the bookshelf engine accesses and manipulates the format file via the layout engine, said generating comprising providing the following features for the 3D bookshelf image: comprising at least one of the following features: new journal, add to bookshelf, remove from bookshelf, show shelf, new shelf, rename shelf, fixed shelf width, flexible shelf width, append content, move to shelf, pack a copy, permanently delete, rename/restyle, sort on, add book ends, remove book ends, select book ends, select background, find, and copy.

13. The method of claim 12 including a plurality of different format files and a plurality of corresponding 3D journal images.

14. The method of claim 12 further comprising at least one of the following features: handling entry types in an entry list, handling reading and writing to a blog, 2D rendering, repaginating, printing, transferring, saving, loading and style settings.

15. The method of claim 12 further comprising at least one of the following: curved video and editing on a surface having a 3D appearance.

16. The method of claim 12 further comprising generating sounds in response to user action.

17. The method of claim 12 wherein the 3D journal image comprises at least one of the following: an on-line magazine, an interactive children's book, a scrapbook, a photo album, a personal journal, a diary, a newsletter a catalog and a log book.

18. A computer readable storage medium comprising instructions for:

selecting video files and image files;

responsive to a format file referenced to the selected video files and referenced to the selected image files, said format file comprising a style sheet defining the format of the 3D journal model, said format file further comprising a journal file referenced to the selected video files and referenced to the selected image files, said format file defining a text file having a 3D appearance corresponding to a 3D journal model, said text file being rendered by a layout engine, said 3D journal model having the following features: animation, navigation, rendering journal entries and editing;

adapting the text file obtained via the content engine and generating journal display data defining a 3D journal image in accordance with the text file of the defined content and the defined format wherein the 3D journal image comprises a 3D rendering of the text file, the journal display data being provided to a display and corresponding the selected video files and the selected image files displayed in a form corresponding to the 3D journal model, wherein a rendering engine renders the 3D journal image on a display, said rendering engine being responsive to user interactions with the 3D image, wherein the rendering engine communicates with the layout engine to modify the journal display data defining the 3D journal image and to modify the formal file defining the text file to render a modified text file in response to user interactions with the 3D journal image and to further render a modified 3D image wherein the modified 3D image and the modified text file reflect the user interactions with the 3D image; and generating bookshelf display data defining a 3D bookshelf image of the 3D journal image, the bookshelf display data being provided to the display and corresponding to a bookshelf file, wherein the rendering engine renders the 3D bookshelf image, and wherein the bookshelf engine accesses and manipulates the format file via the layout engine, said generating comprising providing the following features for the 3D bookshelf image: comprising at least one of the following features: new journal, add to bookshelf, remove from bookshelf, show shelf, new shelf, rename shelf, fixed shelf width, flexible shelf width, append content, move to shelf, pack a copy, permanently delete, rename/restyle, sort on, add book ends, remove book ends, select book ends, select background, find, and copy.

19. The interface of claim 1 wherein the selected video files and the selected image files are 2D bitmap images and the defined content and the defined format correspond to the 2D bitmap images mapped to a surface of a mesh; wherein the journal display data comprises pages, wherein each of the pages has a texture and wherein the textured pages have the 3D appearance when the journal display data is displayed by the display.

20. The interface of claim 1 wherein the selected video files and the selected image files are 2D bitmap images and the defined content and the defined format correspond to the 2D bitmap images mapped to a surface of a mesh.

21. The interface of claim 1 wherein the journal display data comprises pages, wherein each of the pages has a texture and wherein the textured pages have the 3D appearance when the journal display data is displayed by the display.

* * * * *